US012778837B2

(12) United States Patent
Knight et al.

(10) Patent No.: US 12,778,837 B2
(45) Date of Patent: Nov. 3, 2026

(54) VENTILATED VEHICLE SEAT WITH MASSAGE CAPABILITY

(71) Applicant: LEAR CORPORATION, Southfield, MI (US)

(72) Inventors: Andrew Knight, Coventry (GB); Alexander Jones, Coventry (GB); Richard Wearmouth, Durham (GB); Adrian Melia, Coventry (GB)

(73) Assignee: LEAR CORPORATION, Southfield, MI (US)

( * ) Notice: Subject to any disclaimer, the term of this patent is extended or adjusted under 35 U.S.C. 154(b) by 954 days.

(21) Appl. No.: 18/148,205

(22) Filed: Dec. 29, 2022

(65) Prior Publication Data

US 2024/0216213 A1 Jul. 4, 2024

(51) Int. Cl.

| | |
|---|---|
| ***A61H 9/00*** | (2006.01) |
| ***B60H 1/00*** | (2006.01) |
| ***B60N 2/56*** | (2006.01) |
| ***B60N 2/90*** | (2018.01) |

(52) U.S. Cl.

CPC ....... *A61H 9/0078* (2013.01); *B60H 1/00285* (2013.01); *B60N 2/5657* (2013.01); *B60N 2/976* (2018.02); *A61H 2201/0134* (2013.01); *A61H 2201/0149* (2013.01); *A61H 2201/1623* (2013.01); *A61H 2205/081* (2013.01)

(58) Field of Classification Search

CPC .......... A61H 7/00; A61H 7/001; A61H 7/007; A61H 9/00; A61H 9/0007; A61H 9/0021; A61H 9/005; A61H 9/0078; A61H 2009/0035; A61H 2201/01; A61H 2201/0103; A61H 2201/0119; A61H 2201/0138; A61H 2201/0149; A61H 2201/0134; A61H 2201/1623; A61H 2201/1633; A61H 2205/081; A61H 2205/086; B60N 2/00; B60N 2/56; B60N 2/5621; B60N 2/5642; B60N 2/5657; B60N 2/64; B60N 2/66; B60N 2/665; B60N 2/976; B60H 1/00285

See application file for complete search history.

(56) References Cited

U.S. PATENT DOCUMENTS

| | | | | |
|---|---|---|---|---|
| 6,848,742 B1 * | 2/2005 | Aoki | B60N 2/5635 | 454/120 |
| 2006/0217644 A1 * | 9/2006 | Ozaki | A61H 9/0078 | 601/150 |
| 2010/0244504 A1 * | 9/2010 | Colja | A61H 9/0078 | 297/284.6 |
| 2012/0032478 A1 * | 2/2012 | Friderich | B60N 2/5685 | 297/180.1 |
| 2013/0140857 A1 | 6/2013 | Shin et al. | | |
| 2013/0187419 A1 * | 7/2013 | Worlitz | B60N 2/976 | 297/217.1 |

(Continued)

*Primary Examiner* — Colin W Stuart

(74) *Attorney, Agent, or Firm* — Alston & Bird LLP

(57) ABSTRACT

A ventilated seat assembly includes massage cells. Ventilation air is distributed from a fan, through a network of internal passages, to a plurality of outlet passages. The internal passages and outlet passages are arranged to not impact the effectiveness of the massage cells. The seat cushion includes a plurality of massage zones between the internal passages to transmit pressures generated by the massage cells to a seat occupant. The cushion may be formed from two pieces.

20 Claims, 4 Drawing Sheets

(56) References Cited

U.S. PATENT DOCUMENTS

| | | | | |
|---|---|---|---|---|
| 2020/0207243 | A1 | 7/2020 | Rogers et al. | |
| 2021/0162904 | A1 | 6/2021 | Lee et al. | |
| 2021/0289942 | A1 | 9/2021 | Sakai et al. | |
| 2022/0055506 | A1 | 2/2022 | Longatte et al. | |
| 2022/0055507 | A1 | 2/2022 | Okimura et al. | |
| 2022/0339056 | A1* | 10/2022 | Mauffrey | B60N 2/914 |
| 2024/0270141 | A1* | 8/2024 | Zhang | B60N 2/976 |

* cited by examiner

VENTILATED VEHICLE SEAT WITH MASSAGE CAPABILITY

TECHNICAL FIELD

The present disclosure relates to a ventilated seat assembly comprising a seat cushion having a ventilation system and a massage system.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale, and some features may be exaggerated or minimized to show details of particular components. The specific structural and functional details disclosed are not to be interpreted as limiting, but as a representative basis for teaching one skilled in the art how to practice the disclosed concepts.

Various features illustrated and described with reference to any one of the figures may be combined with features illustrated in one or more of the other figures to produce embodiments that are not explicitly illustrated or described. The combinations of features illustrated provide representative embodiments for typical applications. Various combinations and modifications of the features consistent with the teachings of this disclosure could be used in particular applications or implementations.

Figure 1:
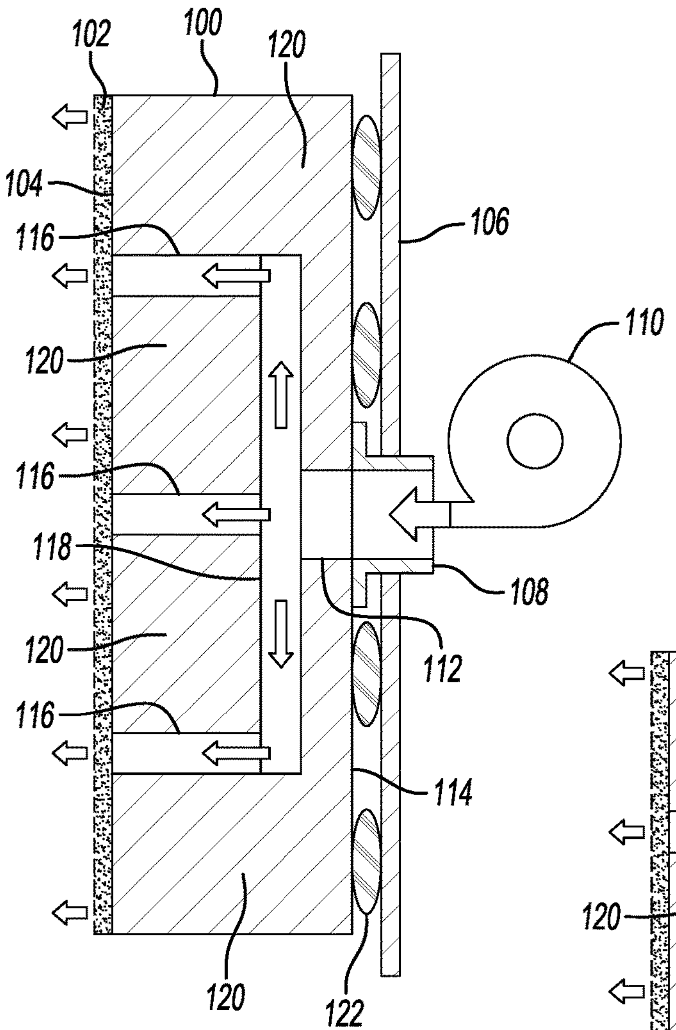
FIG. 1 is a cross-section view of a ventilated seat assembly.

FIG. 1 illustrates a cross-section view of a ventilated seat assembly. The ventilated seat assembly may be a vehicle seat for vehicular applications such as cars, trucks, aircraft, trains, and marine vessels. The ventilated seat assembly may be a seat back or a seat bottom. The terms "front" and "rear" should be interpreted as identifiers and do not limit the orientation of the assembly as installed. The ventilated seat assembly includes a cushion 100 made of foam or any other suitable material. The ventilated seat assembly may include a trim cover 102 disposed over a front surface 104 of the seat cushion 100. The trim cover may be made of fabric, leather, vinyl, or any other suitable material. The trim cover may be air-permeable to allow ventilation of the seat cushion. The trim cover may include perforations or ventilation holes.

The ventilated seat assembly may include a reaction plate 106 defining a duct 108. A blower 110 may be attached to a duct inlet. The blower 110 is configured to pull air from the surrounding environment and push the air through the duct to a duct outlet. The seat cushion 100 has an inlet passage 112 extending to a rear surface 114 of the seat cushion 100 and cooperating with the duct outlet. The seat cushion 100 has a plurality of outlet passages 116 extending to the front surface 104 of the seat cushion. Internal passages 118 connect to and are in fluid communication with the inlet passage 112 and the outlet passages 116. Air flow is directed from the blower 110 toward the trim cover 102 by a ventilation system defined by the inlet passage 112, internal passages 118, and outlet passages 116.

At least one massage zone 120 extends between the front surface 104 and the rear surface 114 between adjacent internal passages 118. At least one massage cell 122 may be disposed adjacent the rear surface 114 of the seat cushion. Inflation of the massage cell 122 actuates the massage zone 120 to massage a seat occupant. A plurality of massage cells 122 may be disposed adjacent to corresponding massage zones 120.

Figure 2:
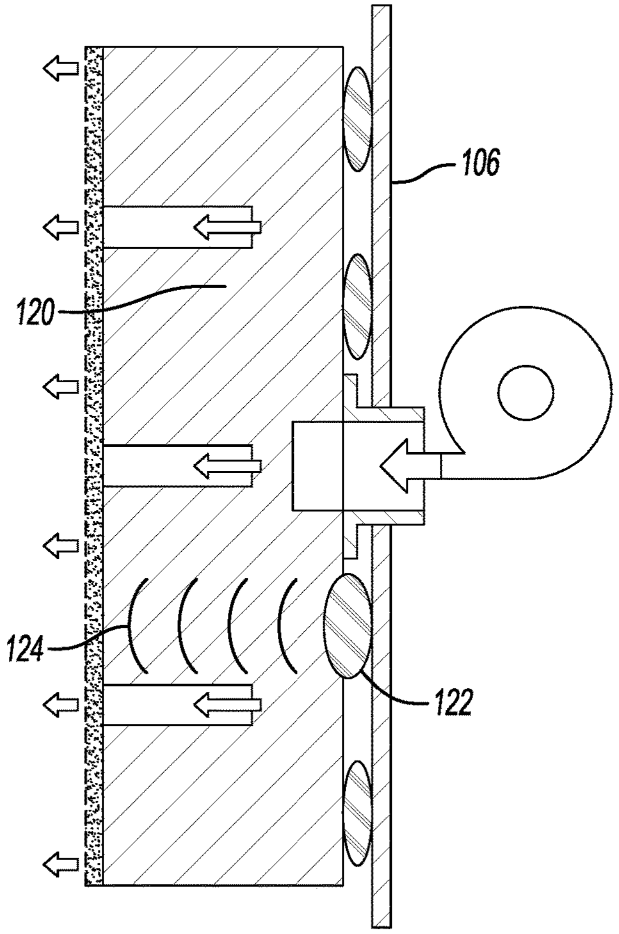
FIG. 2 is a cross-section view of the ventilated seat assembly taken at a different location than the cross section of FIG. 1.

FIG. 2 illustrates a cross-section view of the ventilated seat assembly taken at a different location than the cross section of FIG. 1. The internal passages 118 (not shown) intersect the outlet passages 116. The internal passages 118 may be approximately perpendicular to the outlet passages 116. The massage cells 122 are adjacent the rear surface 114 and located between the outlet passages 116.

Operation of the ventilation system and the massage system may occur at different times or at the same time. Placement of the massage cells 122 adjacent massage zones 120 and without additional ventilation elements allows the massage system to operate independently of the ventilation system and each massage zone 120 is a semi-discrete massage region 124 to massage a seat occupant.

Figure 3:
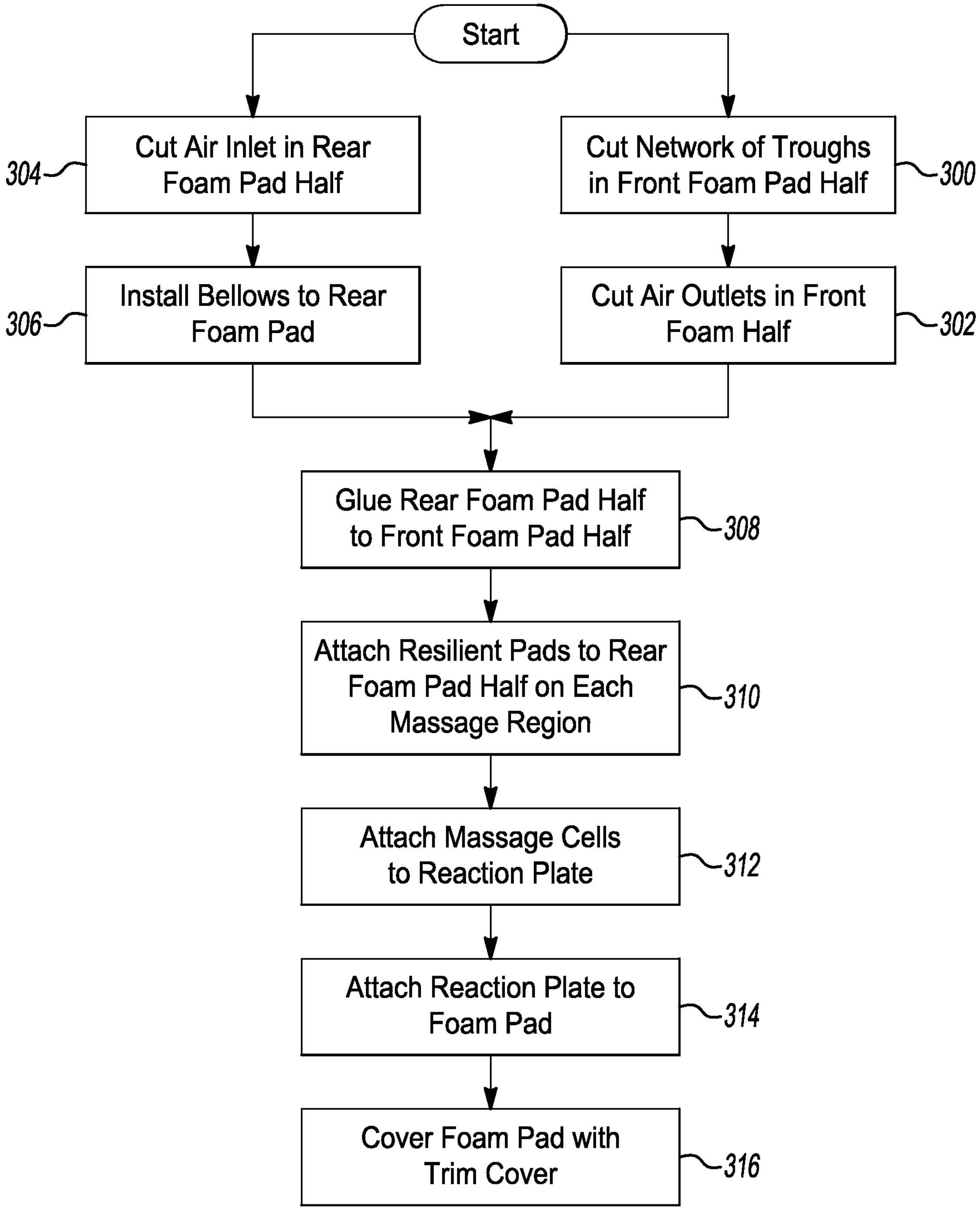
FIG. 3 is a flow chart of a method for manufacturing the ventilated seat assembly.
Figure 4:
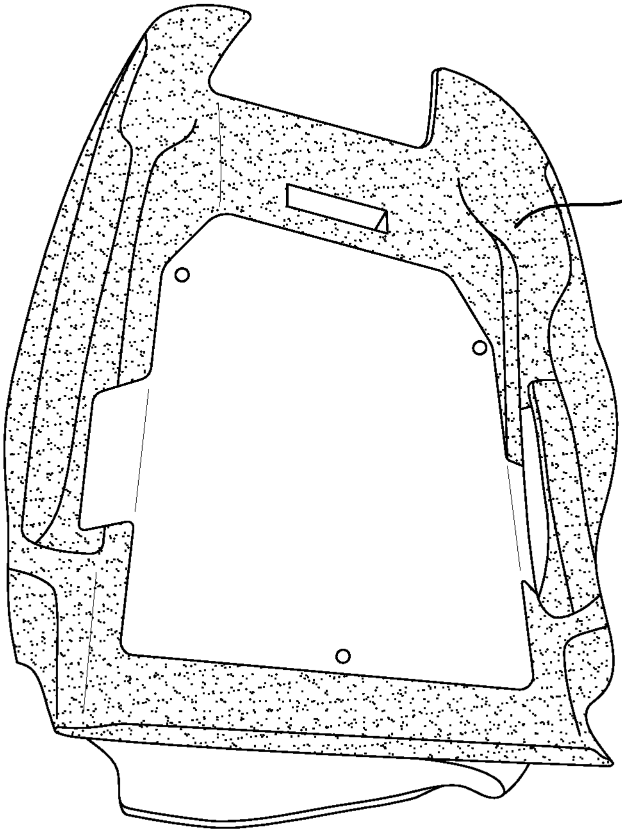
FIG. 4 is a perspective view of a front foam piece.
Figure 5:
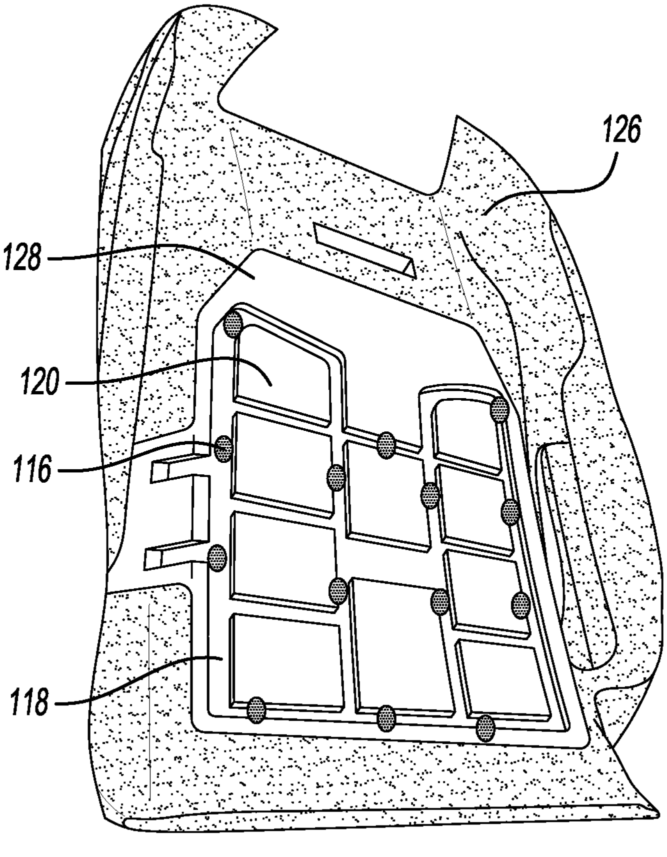
FIG. 5 is a perspective view of the front foam piece at a different stage in the manufacturing process.
Figure 6:
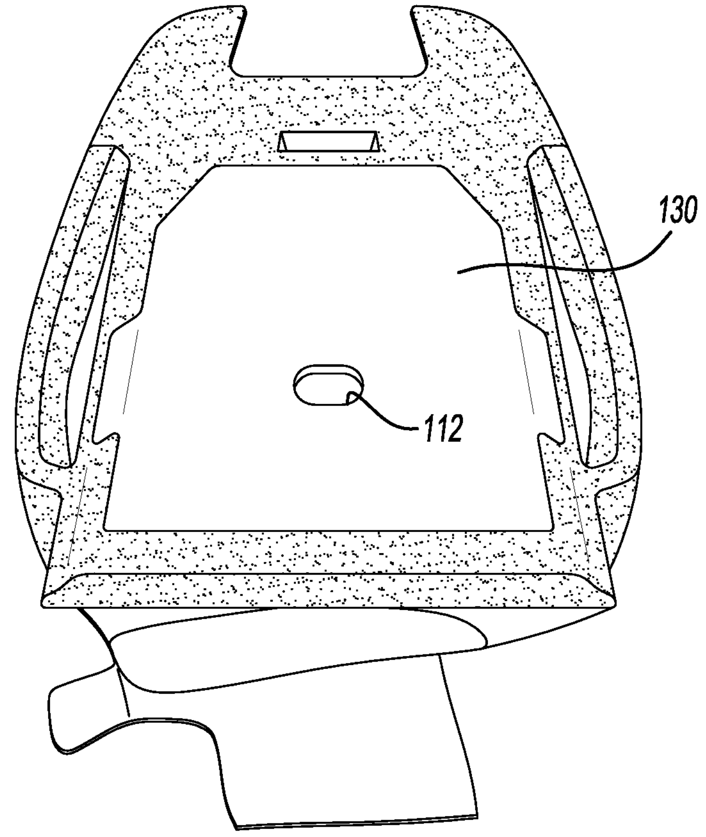
FIG. 6 is a perspective view of a rear foam piece attached to the front foam piece.
Figure 7:
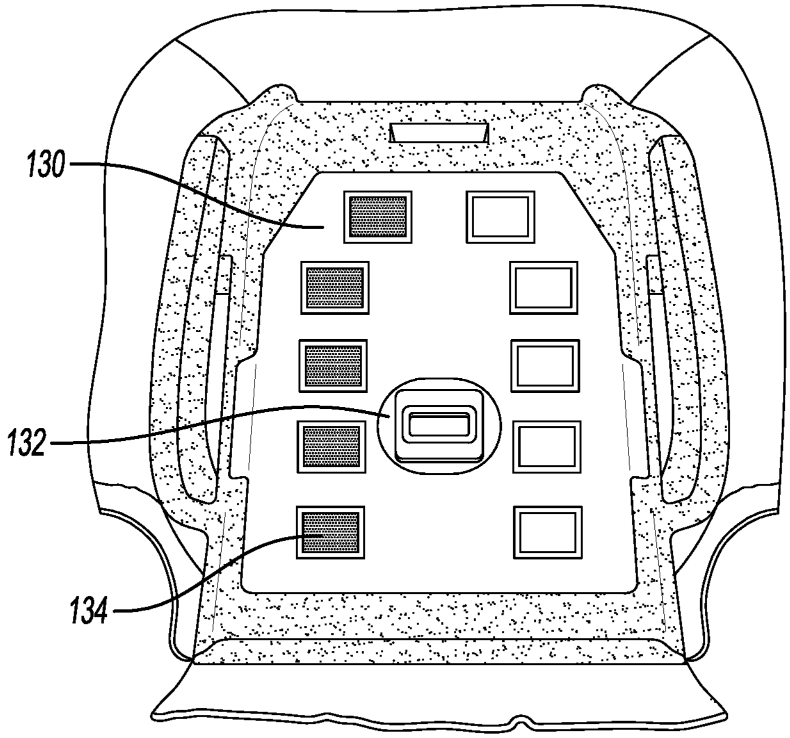
FIG. 7 is a perspective view of an assembled ventilated seat assembly.

Referring to FIG. 3, an exemplary method to make the ventilated seat assembly is described. The seat cushion 100 is formed from a front foam piece 126 and a rear foam piece 130. The front foam piece 126 is shown at various stages of the process in FIGS. 4 and 5. The rear foam piece 130 is shown at various stages of the process in FIGS. 6 and 7. At 300, a network of troughs is cut in a rear surface of the front foam piece 126 as shown in FIG. 5. These troughs will eventually become the internal passages 116. Alternatively, the internal passages could be created by cutting troughs in a front surface of rear foam piece 130. At 302, outlet passages 116 intersecting the internal passages 118 are cut into the front foam piece 126. At 304, the inlet passage 112 is cut in and extends through the rear foam piece 130 as shown in FIG. 6. In some embodiments, the inlet passages, outlet passages, and troughs may be integrally formed in the front piece or the rear piece when the piece is molded eliminating the need for a separate cutting step. At 306, a bellows 132 is attached to the rear foam piece 130 as shown in FIG. 7. The bellows 132 is in fluid communication with the inlet passage 112 and the blower 110. At 308, the front foam piece 126 and the rear foam piece 130 are attached to one another. The front foam piece 126 and the rear foam piece 130 may be glued or attached by any other suitable means. At 310, resilient pads 134, made of a different material than the cushion, are attached to a rear surface of the rear foam piece 130. The resilient pads 134 are disposed adjacent massage zones 120, as shown in FIG. 7. At 312, the massage cells 122 are attached to the reaction plate 106. At 314, the reaction plate 106 is attached to the seat cushion 100. At 316, the trim cover 102 is installed over the seat cushion 100.

In one embodiment, a vehicle seat includes a reaction plate, a cushion, and a plurality of massage cells. The reaction plate defines a duct with a duct outlet. The cushion may be a seat bottom or a seat back. The cushion has a rear surface facing the reaction plate and a front surface opposite the rear surface. The cushion defines an inlet passage extending to the rear surface and cooperable with the duct outlet. The cushion further defines a plurality of outlet passages extending to the front surface and a network of internal passages connecting the outlet passages to the inlet passage. A plurality of massage zones extend between the front surface and the rear surface between adjacent internal passages. Each of the massage cells is arranged between the reaction plate and a massage zone. A trim cover mat be adjacent to the front surface of the cushion. A fan may be configured to blow air through the duct, the duct outlet, the inlet passage, the internal passages, and the outlet passages. A plurality of resilient pads, made of a material different than the cushion, may be attached to the rear surface of the cushion between each of the massage cells and the corresponding massage zone. The cushion may be formed from a front foam piece and a rear foam piece. The front foam piece may define the outlet passages and a network of troughs connecting the outlet passages to one another. The rear foam piece may define the inlet passage and may be connected to the front foam piece such that the troughs become the internal passages. Activation of the massage cells may not restrict airflow through any of the passages.

In another embodiment, a ventilated seat assembly includes a cushion, a trim cover, and a plurality of massage cells. The cushion has a front surface and a rear surface. The cushion defines a plurality of internal passages spaced apart from one another and a plurality of outlet passages in fluid communication with the plurality of internal passages to form a ventilation system. The cushion has a plurality of massage zones, each extending from the front surface to the rear surface between adjacent internal passages. The trim cover is disposed over the front surface of the cushion. Each of the massage cells is disposed adjacent a corresponding one of the massage zones. A reaction plate may be adjacent to the rear surface such that the plurality of massage cells are between the reaction plate and the rear surface. The reaction plate may include a duct in fluid communication with the internal passages. A fan may be configured to blow air through the duct, the internal passages, and the outlet passages. A plurality of resilient pads, made of a material different than the cushion, may be attached to the rear surface of the cushion between each of the massage cells and the corresponding massage zone. The cushion may be formed from a front foam piece and a rear foam piece. The front foam piece may define the outlet passages and a network of troughs connecting the outlet passages to one another. The rear foam piece may be connected to the front foam piece such that the troughs become the internal passages. Activation of the massage cells may not restrict airflow through any of the passages.

In another embodiment, a ventilated seat assembly includes a cushion and a plurality of massage cells. The cushion has a front surface and a rear surface. The cushion defines a plurality of internal passages spaced apart from one another and a plurality of outlet passages in fluid communication with the plurality of internal passages to form a ventilation system. Each of the massage cells is disposed proximate to the rear surface such that pressures generated by inflation of the massage cells are transmissible to the front surface between adjacent internal passages. A trim cover may be adjacent to the front surface of the cushion. A reaction plate may be adjacent to the rear surface such that the plurality of massage cells are between the reaction plate and the rear surface. The reaction plate may include a duct in fluid communication with the internal passages. A fan may be configured to blow air through the duct, the internal passages, and the outlet passages. Resilient pads, made of a material different than the cushion, may be attached to the rear surface of the cushion adjacent to the massage cells. The cushion may be formed from a front foam piece and a rear foam piece. The front foam piece may define the outlet passages and a network of troughs connecting the outlet passages to one another. The rear foam piece may be connected to the front foam piece such that the troughs become the internal passages. Activation of the massage cells may not restrict airflow through any of the passages.

Aspect 1. A vehicle seat comprising a reaction plate defining a duct with a duct outlet and a cushion having a rear surface facing the reaction plate and a front surface opposite the rear surface. The cushion defines an inlet passage extending to the rear surface and cooperable with the duct outlet, a plurality of outlet passages extending to the front surface, and a network of internal passages connecting the outlet passages to the inlet passage. The cushion has a plurality of massage zones extending between the front surface and the rear surface between adjacent internal passages. The vehicle seat also has a plurality of massage cells, with each massage cell arranged between the reaction plate and a massage zone of the cushion.

Aspect 2. The vehicle seat of aspect 1 further comprising a trim cover adjacent to the front surface of the cushion.

Aspect 3. The vehicle seat of aspects 1 or 2 further comprising a fan configured to blow air through the duct, the duct outlet, the inlet passage, the internal passages, and the outlet passages.

Aspect 4. The vehicle seat of aspects 1 to 3 further comprising a plurality of resilient pads, made of a material different than the cushion, attached to the rear surface of the cushion between each of the massage cells and the corresponding massage zone.

Aspect 5. The vehicle seat of aspects 1 to 4 wherein the cushion is foam.

Aspect 6. The vehicle seat of aspect 5 wherein the cushion comprises a front foam piece defining the outlet passages and a network of troughs connecting the outlet passages to one another; and a rear foam piece defining the inlet passage and connected to the front foam piece such that the troughs become the internal passages.

Aspect 7. The vehicle seat of aspects 1 to 6 wherein activation of the massage cells does not restrict airflow through any of the passages.

Aspect 8. The vehicle seat of aspects 1 to 7 wherein the cushion forms a seat back.

Aspect 9. The vehicle seat of aspects 1 to 8 wherein the cushion forms a seat bottom.

Aspect 10. A ventilated seat assembly comprising a cushion having a front surface and a rear surface. The cushion defines a plurality of internal passages spaced apart from one another and a plurality of outlet passages in fluid communication with the plurality of internal passages to form a ventilation system. The cushion has a plurality of massage zones, with each massage zone extending from the front surface to the rear surface between adjacent internal passages a trim cover disposed over the front surface of the cushion. The ventilated seat assembly also has a plurality of massage cells, with each cell disposed adjacent a corresponding one of the massage zones.

Aspect 11. The ventilated seat assembly of aspect 10 further comprising a reaction plate adjacent to the rear surface such that the plurality of massage cells are between the reaction plate and the rear surface, the reaction plate including a duct in fluid communication with the internal passages; and a fan configured to blow air through the duct, the internal passages, and the outlet passages.

Aspect 12. The ventilated seat assembly of aspects 10 or 11 further comprising a plurality of resilient pads, made of a material different than the cushion, attached to the rear surface of the cushion between each of the massage cells and the corresponding massage zone.

Aspect 13. The ventilated seat assembly of aspects 10 to 12 wherein the cushion comprises a front foam piece defining the outlet passages and a network of troughs connecting the outlet passages to one another; and a rear foam piece connected to the front foam piece such that the troughs become the internal passages.

Aspect 14. The ventilated seat assembly of aspects 10 to 13 wherein activation of the massage cells does not restrict airflow through any of the passages.

Aspect 15. A ventilated seat assembly comprising a cushion having a front surface and a rear surface, with the cushion defining a plurality of internal passages spaced apart from one another and a plurality of outlet passages in fluid communication with the plurality of internal passages to form a ventilation system. The ventilated seat assembly also has a plurality of massage cells, with each cell disposed proximate to the rear surface such that pressures generated by inflation of the massage cells are transmissible to the front surface between adjacent internal passages.

Aspect 16. The ventilated seat assembly of aspect 15 further comprising a trim cover adjacent to the front surface of the cushion.

Aspect 17. The ventilated seat assembly of aspects 15 or 16 further comprising a reaction plate adjacent to the rear surface such that the plurality of massage cells are between the reaction plate and the rear surface, the reaction plate including a duct in fluid communication with the internal passages; and a fan configured to blow air through the duct, the internal passages, and the outlet passages.

Aspect 18. The ventilated seat assembly of aspects 15 to 17 further comprising a plurality of resilient pads, made of a material different than the cushion, each attached to the rear surface of the cushion adjacent to one of the massage cells.

Aspect 19. The ventilated seat assembly of aspects 15 to 18 wherein the cushion comprises a front foam piece defining the outlet passages and a network of troughs connecting the outlet passages to one another; and a rear foam piece connected to the front foam piece such that the troughs become the internal passages.

Aspect 20. The ventilated seat assembly of aspects 15 to 19 wherein activation of the massage cells does not restrict airflow through any of the passages.

Further aspects are also contemplated, consistent with the above disclosed embodiments and their combinations.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and includes modifications of the illustrated embodiments. In addition, the features of various implementing embodiments may be combined to form further embodiments of the invention.

What is claimed is:

1. A vehicle seat, comprising:

a reaction plate defining a duct with a duct outlet;

a cushion comprising a rear surface facing the reaction plate and a front surface opposite the rear surface, the cushion defining an inlet passage extending to the rear surface and cooperable with the duct outlet, a plurality of outlet passages extending to the front surface, and a network of internal passages connecting the plurality of outlet passages to the inlet passage, the cushion comprising a plurality of massage zones extending between the front surface and the rear surface, wherein each massage zone of the plurality of massage zones is located between two adjacent outlet passages of the plurality of outlet passages; and a plurality of massage cells arranged between the reaction plate and the cushion, wherein each massage cell of the plurality of massage cells is disposed adjacent to a corresponding massage zone of the plurality of massage zones located between the two adjacent outlet passages.

2. The vehicle seat of claim 1, further comprising a trim cover adjacent to the front surface of the cushion.

3. The vehicle seat of claim 1, further comprising a fan configured to blow air through the duct, the duct outlet, the inlet passage, the network of internal passages, and the plurality of outlet passages.

4. The vehicle seat of claim 1, further comprising a plurality of resilient pads, made of a material different than the cushion, attached to the rear surface of the cushion between each of the plurality of massage cells and the corresponding massage zone of the plurality of massage zones.

5. The vehicle seat of claim 1, wherein the cushion is foam.

6. The vehicle seat of claim 5, wherein the cushion comprises:

a front foam piece defining the plurality of outlet passages and a network of troughs connecting the plurality of outlet passages to one another; and a rear foam piece defining the inlet passage and connected to the front foam piece such that the network of troughs become the network of internal passages.

7. The vehicle seat of claim 1, wherein activation of the plurality of massage cells does not restrict airflow through any of the plurality of outlet passages.

8. The vehicle seat of claim 1, wherein the cushion forms a seat back.

9. The vehicle seat of claim 1, wherein the cushion forms a seat bottom.

10. A ventilated seat assembly comprising:

a cushion comprising a front surface and a rear surface, the cushion defining an internal passage and a plurality of outlet passages in fluid communication with the internal passage to form a ventilation system, the cushion comprising a plurality of massage zones, each massage zone of the plurality of massage zones extending from the front surface to the rear surface wherein each massage zone of the plurality of massage zones is located between two adjacent outlet passages of the plurality of outlet passages;

a trim cover disposed over the front surface of the cushion; and a plurality of massage cells, each massage cell of the plurality of massage cells is disposed adjacent to a corresponding massage zone of the plurality of massage zones located between the two adjacent outlet passages.

11. The ventilated seat assembly of claim 10, further comprising:

a reaction plate adjacent to the rear surface such that the plurality of massage cells are between the reaction plate and the rear surface, the reaction plate including a duct in fluid communication with the internal passage; and a fan configured to blow air through the duct, the internal passage, and the plurality of outlet passages.

12. The ventilated seat assembly of claim 10, further comprising a plurality of resilient pads made of a material different than the cushion, wherein the plurality of resilient pads is attached to the rear surface of the cushion between each of the plurality of massage cells and the corresponding massage zone of the plurality of massage zones.

13. The ventilated seat assembly of claim 10, wherein the cushion comprises:

a front foam piece defining the plurality of outlet passages and a network of troughs connecting the plurality of outlet passages to one another; and a rear foam piece connected to the front foam piece such that the network of troughs become the internal passage.

14. The ventilated seat assembly of claim 10 wherein activation of massage cells of the plurality of massage cells does not restrict airflow through any of the plurality of outlet passages.

15. A ventilated seat assembly, comprising:

a cushion comprising a front surface and a rear surface, the cushion defining an internal passage and a plurality of outlet passages in fluid communication with the internal passage to form a ventilation system, wherein the cushion comprising a plurality of massage zones extending between the front surface and the rear surface, wherein each massage zone of the plurality of massage zones is located between two adjacent outlet passages of the plurality of outlet passages; and a plurality of massage cells, each massage cell of the plurality of massage cells disposed proximate to the rear surface such that pressures generated by inflation of the plurality of massage cells are transmissible to the front surface, wherein each massage cell of the plurality of massage cells is disposed adjacent to a corresponding massage zone of the plurality of massage zones located between the two adjacent outlet passages of the plurality of outlet passages.

16. The ventilated seat assembly of claim 15, further comprising a trim cover adjacent to the front surface of the cushion.

17. The ventilated seat assembly of claim 15, further comprising:

a reaction plate adjacent to the rear surface such that the plurality of massage cells are between the reaction plate and the rear surface, the reaction plate including a duct in fluid communication with the internal passage; and a fan configured to blow air through the duct, the internal passage, and the plurality of outlet passages.

18. The ventilated seat assembly of claim 15, further comprising a plurality of resilient pads made of a material different than the cushion, wherein each resilient pad of the plurality of resilient pads is attached to the rear surface of the cushion adjacent to one of the plurality of massage cells.

19. The ventilated seat assembly of claim 15, wherein the cushion comprises:

a front foam piece defining the plurality of outlet passages and a network of troughs connecting the plurality of outlet passages to outlet passages to one another; and a rear foam piece connected to the front foam piece such that the network of troughs become the internal passage.

20. The ventilated seat assembly of claim 15, wherein activation of the plurality of massage cells does not restrict airflow through any of the plurality of outlet passages.

* * * * *